US006931845B2

(12) United States Patent
Schaeffer

(10) Patent No.: US 6,931,845 B2
(45) Date of Patent: Aug. 23, 2005

(54) FREE PISTON ENGINE

(75) Inventor: Rudolf Schaeffer, Marktheidenfeld (DE)

(73) Assignee: Bosch Rexroth AG, Stuttgart (DE)

(*) Notice: Subject to any disclaimer, the term of this patent is extended or adjusted under 35 U.S.C. 154(b) by 40 days.

(21) Appl. No.: 10/276,849

(22) PCT Filed: May 15, 2001

(86) PCT No.: PCT/DE01/01828

§ 371 (c)(1),
(2), (4) Date: May 9, 2003

(87) PCT Pub. No.: WO01/88352

PCT Pub. Date: Nov. 22, 2001

(65) Prior Publication Data

US 2004/0065277 A1 Apr. 8, 2004

(30) Foreign Application Priority Data

May 19, 2000 (DE) ........................................ 100 24 737
Apr. 24, 2001 (DE) ........................................ 101 20 196

(51) Int. Cl.[7] ................................................ F16D 31/02
(52) U.S. Cl. ........................................... 60/413; 60/596
(58) Field of Search .................... 60/413, 596; 417/364

(56) References Cited

U.S. PATENT DOCUMENTS 5,556,262 A * 9/1996 Achten et al. .............. 417/364
6,293,231 B1 * 9/2001 Valentin ...................... 60/413

FOREIGN PATENT DOCUMENTS

| | | |
|---|---|---|
| DE | 3327334 | 2/1985 |
| EP | 0045472 | 3/1986 |
| EP | 0613521 | 1/1996 |
| WO | WO 93/10345 | 5/1993 |
| WO | WO 98/54450 | 12/1998 |
| WO | WO 0050755 | 8/2000 |

* cited by examiner

*Primary Examiner*—Edward K. Look
*Assistant Examiner*—Michael Leslie
(74) *Attorney, Agent, or Firm*—Boyle Fredrickson Newholm Stein & Gratz S.C.

(57) ABSTRACT

A free-piston engine has a stepped piston having a larger end face thereof guided in the compression cylinder, and a smaller end face in the work cylinder. Both the work cylinder and the compression cylinder are connected with a common high-pressure accumulator for initiating the compression stroke or for charging during the expansion stroke.

16 Claims, 7 Drawing Sheets

FREE PISTON ENGINE

BACKGROUND OF THE INVENTION

1. Field of the Invention

The invention relates to a free-piston engine.

2. Description of the Related Art

A free-piston engine fundamentally is a combustion engine working according to the 2-cycle method and having not a crankshaft drive but a hydraulic circuit including a reciprocating pump as its subsequently arranged drive train. To this end, the engine piston is connected to a hydraulic cylinder whereby the translatory energy generated during a work cycle of the engine is supplied directly to the hydraulic work medium, without the classical by-way of the rotary movement of a crankshaft drive. The subsequently arranged, storage-capability hydraulic circuit is designed such as to absorb the output power and buffer it for supplying it to a hydraulic output unit, e.g., an axial piston engine, in accordance with power demand.

In DE 40 24 591 A1 a free-piston engine of the generic type is described, also known as a Brandl free-piston engine. In the case of this concept, the compression movement of the engine piston takes place through co-operation with a hydraulic piston which may be connected to a high-pressure accumulator or a low-pressure accumulator via a 2/3-way switchover valve. At the beginning of the compression stroke, an acceleration of the engine piston takes place through applying the pressure in the high-pressure accumulator to the hydraulic cylinder. Once a predetermined engine piston velocity is reached, the hydraulic cylinder is connected to the low-pressure accumulator via the switchover valve, so that the further compression stroke of the engine piston takes place against the effective force from the compression pressure of the work gas. After the outer dead center (AT) has been reached, the work gas is ignited, and the engine piston is accelerated towards the inner dead center (IT). During this piston movement from AT to IT, the connection with the high-pressure accumulator is controlled open via the switchover valve, whereby the engine piston is decelerated and the kinetic energy thereof is converted to potential hydraulic energy, and the high-pressure accumulator is charged. Although the response times of the switchover valve are in the milliseconds range, throttling losses possibly in the order of 10% of the engine power are engendered in the switchover valve by controlling the connection to the high-pressure accumulator open and closed.

These drawbacks of the Brandl free-piston engine may be overcome with the aid of another free-piston design, the so-called INNAS engine as disclosed, e.g., in WO 9603576 A1.

In this INNAS free-piston engine the hydraulic piston is designed as a step piston and has two effective surfaces, the larger, first one of which is arranged in a compression cylinder, while the smaller, second one defines a pump working chamber or work cylinder. The large surface is capable of being subjected to the pressure in a compression cylinder, whereas the work cylinder may be connected with a high-pressure accumulator or a low-pressure accumulator via check valves. This INNAS free-piston engine has a substantially more complex structure in comparison with the Brandl free-piston engine, so that expenditure in terms of device technology is relatively high.

In view of the above, the invention is based on the object of further developing the generic free-piston engine in such a way as to minimize expenditure in terms of device technology.

This object is achieved through a free-piston engine having the features of claim 1.

SUMMARY OF THE PRESENT INVENTION

The free-piston engine of the invention has a stepped piston having a larger end face thereof guided in the compression cylinder, and a smaller end face in the work cylinder. Both the work cylinder and the compression cylinder may be connected with a common high-pressure accumulator for initiating the compression stroke or for charging during the expansion stroke. In comparison with the INNAS free-piston engine described at the outset, this variant has the advantage of merely two pressure accumulators, i.e., a low-pressure accumulator and a high-pressure accumulator, being sufficient for operation, whereas in the generic INNAS free-piston engine three pressure accumulators with the associated lines have to be provided. The system may thus be constructed substantially more compact at a lower expenditure in terms of device technology, so that the production costs of the free-piston engine are reduced in comparison with the solutions described at the outset.

Another advantage resides in the fact that the hydraulic piston, or the engine piston, respectively, has an inner dead center position which is achieved automatically as a result of the pressure conditions. At a high pressure in the high-pressure accumulator, the engine piston has to work against this high pressure during the expansion stroke, so that the expansion stroke is completed at an earlier point than in the presence of a lower pressure in the high-pressure accumulator on account of the equilibrium of forces. Due to this shift of dead center position, the acceleration distance available during the compression stroke in the following cycle is correspondingly shorter. As the pressure in the high-pressure accumulator during the compression stroke acts on the larger end face, this shorter acceleration distance is compensated by the higher pressure, so that the engine piston is accelerated to about the same velocity as in the case of a lower pressure with a longer acceleration distance. The energy supplied to the engine piston thus remains about equal to the energy supplied to it in the case of a lower pressure of the high-pressure accumulator and in turn a longer acceleration distance.

It is another essential advantage of the solution in accordance with the invention that the sucking in of pressure medium during the return movement of the hydraulic piston from its dead center position takes place virtually along the entire path of the hydraulic piston, whereas in the Brandl free-piston engine described at the outset, sucking in of the pressure medium from the low-pressure accumulator only took place after a predetermined acceleration of the hydraulic piston had been attained.

In this solution, in a case where the inner dead center of the engine piston is not reached, for example as the result of misfiring, the inner dead center may be reached by applying the pressure in the low-pressure accumulator to the work cylinder.

In a preferred solution both the compression chamber defined by the larger end face and the work chamber defined by the annular face are connected with the hydraulic accumulator during the compression stroke. During the compression stroke, pressure medium is here supplied from the high-pressure accumulator, and at the same time the pressure medium is returned out of the work cylinder to the high-pressure accumulator the piston area acting in the direction of compression thus corresponds to the area difference between the larger end face and the annular face of the piston preferably having the form of a differential piston. As a result of these variants, the flows of pressure medium across a starting valve controlling the connection to the high-pressure accumulator open and closed, may be reduced substantially in comparison with the conventional solutions.

A version including a differential piston has a substantially smaller structural length than the INNAS free-piston engine, for in the solution of the invention the compression cylinder is used both for pressure application during the compression stroke and for charging the high-pressure accumulator.

Instead of a differential cylinder it is also possible to use a piston comprising a piston collar and having its piston rod guided in the work cylinder and its larger-diameter piston portion in the compression cylinder. In order to initiate the compression stroke, the annular end face of the step piston is connected with the high-pressure accumulator, wherein the pressure in the low-pressure accumulator acts on the smaller end face of the piston rod, so that the compression stroke is supported by pressure medium being sucked in from the low-pressure accumulator.

In an advantageous development, the step piston is provided with a control land whereby a connection with the high-pressure accumulator may be controlled open during the compression stroke, so that after a predetermined acceleration distance of the hydraulic piston, pressure medium is fed directly from the high-pressure accumulator into the compression cylinder while bypassing the starting valve. As the main flow of pressure medium thus need not be guided via the starting valve, throttling losses may be lowered further.

In a particularly preferred variant, the free-piston engine includes a directional control valve with the aid of which a starting line surrounding the starting valve may be controlled open, so that a large area of cross-section is provided for accelerating the free piston upon starting the engine. This directional control valve remains open during operation of the free-piston engine.

In this variant it is preferred if the directional control valve has the form of a logic valve having a stepped logic piston. A smaller area of cross-section of the logic piston is capable of receiving the pressure in the high-pressure accumulator via an upstream release valve, whereas the larger area of cross-section of the logic piston is subjected to the pressure in the compression cylinder.

The release valve is preferably designed as a 3/2-way directional control valve through which the smaller area of cross-section may optionally be subjected to the pressure in the high-pressure accumulator or to the tank pressure.

For the case that the engine piston cannot be returned into its outer dead center position due to misfiring or some other malfunction, the free-piston engine may be provided with retracting means. Here the compression cylinder may be connected with a tank through a piston retracting assembly, so that the piston end face acting in the direction toward the outer dead center is relieved of pressure.

In a particularly preferred practical example, the piston retracting assembly has a shut-off valve, in the open position of which the work cylinder is connected with the compression cylinder.

The piston retracting assembly moreover includes a piston retracting valve through the intermediary of which the compression cylinder may be connected to the tank.

In accordance with the invention, the shut-off valve is integrated into the hydraulic piston. This solution furnishes the advantage that throttling losses are minimum owing to the short connection paths between the compression cylinder and the work cylinder. Moreover this arrangement has a very compact construction, for it is not necessary to provide separate receptions for the piston retracting assembly. Compactness may be further improved if the check valve is also integrated in the hydraulic piston.

One possibility for integration of the check valve and of the shut-off valve consists in the hydraulic piston being designed in two parts with a collar and a piston rod, wherein the collar is designed to be slidingly displaceable on the piston rod through the intermediary of a sliding sleeve. The collar closes off a control cross-section in a translatory position, so the connection between the compression cylinder and the work cylinder is controlled closed. In its check position, the control cross-section correspondingly is controlled open.

In the case of this constructive solution, a closing body is axially slidingly guided in one end portion of the piston rod to block a recess in the collar when located in a spring-biased home position at low pressure in the compression cylinder. The closing body rises when pressure is built up in the compression cylinder, so that the connection between the compression cylinder and the work cylinder is only closed again by the above described axial displacement of the collar.

In the case of a malfunction, the step piston may actively be displaced in a direction toward the outer dead center when its annular end face acting in the direction toward the outer dead center may be subjected to the pressure in the high-pressure accumulator, wherein at least one of surfaces of the step piston acting in the opposite direction is relieved of pressure. Returning is particularly simple if the annular end face on the engine piston side is designed to have a larger area than the annular end face of the step piston acting in the direction toward the inner dead center.

In order to influence the compression pressure in some degree, a bypass line may be provided in the low-pressure passage leading to the low-pressure accumulator whereby the check valve located there may be bypassed. This bypass line can be blocked by means of a metering valve.

Further advantageous developments of the invention are the subject matters of the further subclaims.

BRIEF DESCRIPTION OF THE DRAWINGS

Preferred practical examples of the invention are explained in more detail hereinbelow by referring to schematic drawings, wherein.

DETAILED DESCRIPTION OF THE PREFERRED EMBODIMENTS

Figure 1:
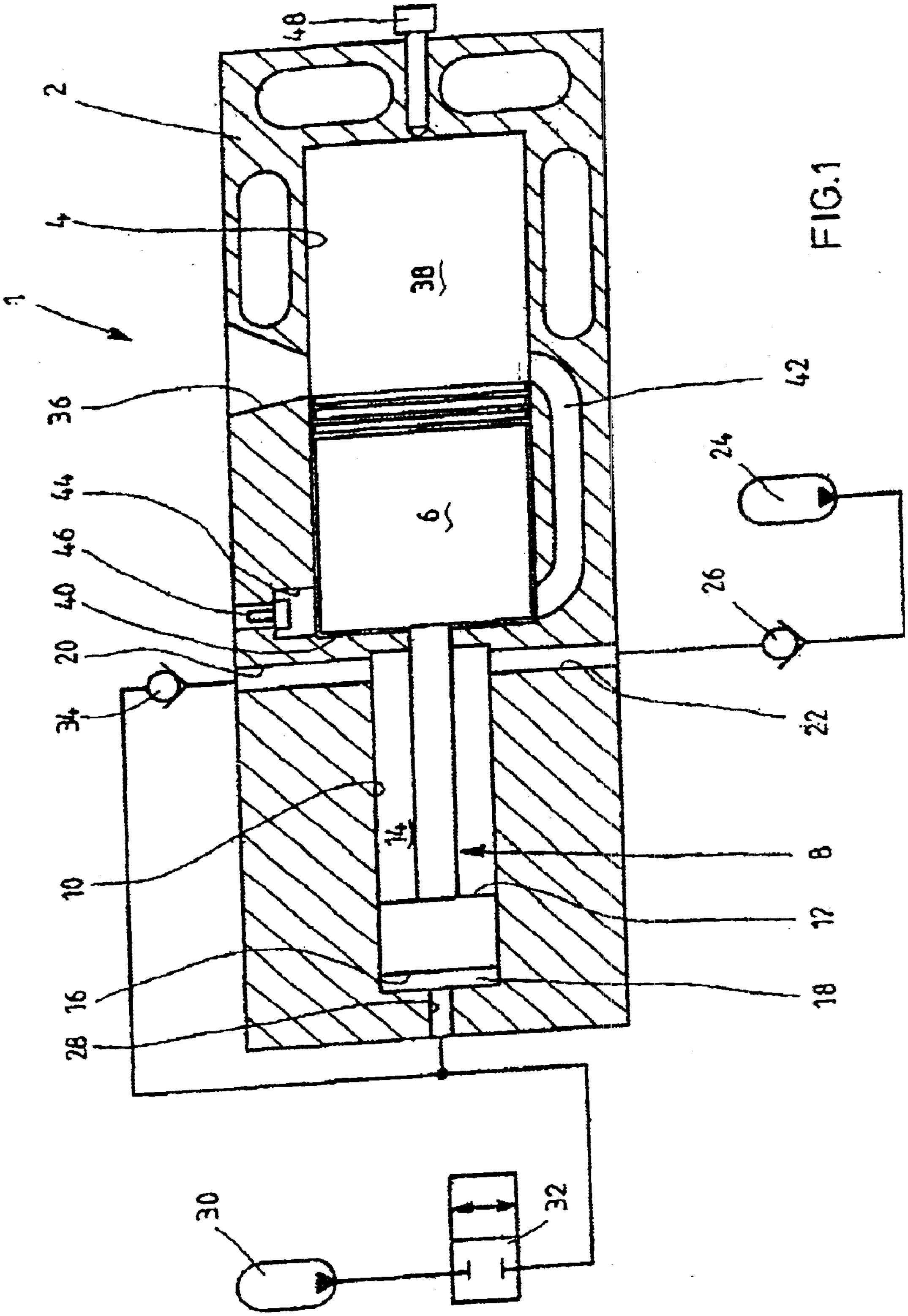
FIG. 1 shows a practical example of a free-piston engine which includes a hydraulic piston designed as a differential piston.

FIG. 1 shows a schematic representation of a first practical example of a free-piston engine 1. It has an engine housing 2, in the combustion cylinder 4 of which an engine piston 6 is guided. The latter is in operative connection with a coaxially arranged hydraulic piston 8 guided in an axial bore 10. An annular end face 12 of the hydraulic piston 8 defines a work cylinder 14, while the larger end face 16 of the hydraulic piston 8 defines a compression cylinder 18.

A pressure passage 20 and a low-pressure passage 22 merge into work cylinder 14. The low-pressure passage is connected with a low-pressure accumulator 24 wherein a pressure medium flow from work cylinder 14 to low-pressure accumulator 24 is prevented by a check valve 26.

Compression cylinder 18 is connected with a high-pressure accumulator 30 via a high-pressure passage 28 wherein the high-pressure passage 28 may be controlled open and closed with the aid of a starting valve 32 designed as a 2/2-way directional control valve. Pressure passage 20 merges into high-pressure passage 28. Through the intermediary of another check valve 34 a flow of pressure medium from high-pressure accumulator 30 into work cylinder 14 is prevented.

Combustion cylinder 4 is provided with an outlet passage 36 through which exhaust gas may be discharged from the combustion chamber 38 defined by engine piston 6.

The rear side of engine piston 6 facing hydraulic piston 8 defines an intake chamber 40 having its minimum volume in the represented inner dead center position of engine piston 6. Intake chamber 40 is connected with combustion chamber 38 through an overflow passage 42.

Fresh air may be supplied during the compression stroke of the engine piston 6 via an intake passage 44 including an intake valve 46. Ignition of the free-piston engine is effected by the injection of fuel through an injector 48 opening into the combustion cylinder.

In the following, the function of the free-piston engine represented in FIG. 1 is explained. At the beginning of a cycle, combustion chamber 38 is filled with fresh air, starting valve 32 is closed, with engine piston 6 and hydraulic piston 8 in their dead center position (IT) as represented in FIG. 1.

In order to initiate the compression stroke, starting valve 32 is opened so that high-pressure accumulator 30 is connected with compression cylinder 18. Owing to the pressure acting on the larger end face 16, the hydraulic piston is accelerated from its dead center position, and this acceleration is transferred to the engine piston 6. The pressure medium present in work cylinder 14 is conveyed via check valve 34 and pressure line 20 back into pressure passage 28. I.e., end face 16 and annular end face 12 of hydraulic piston 8 are subjected to the pressure in high-pressure accumulator 30, so that the end face corresponding to the area of the piston rod acts in the direction toward the outer dead center (AT). The connection to low-pressure accumulator 24 is blocked by check valve 26.

Figure 2:
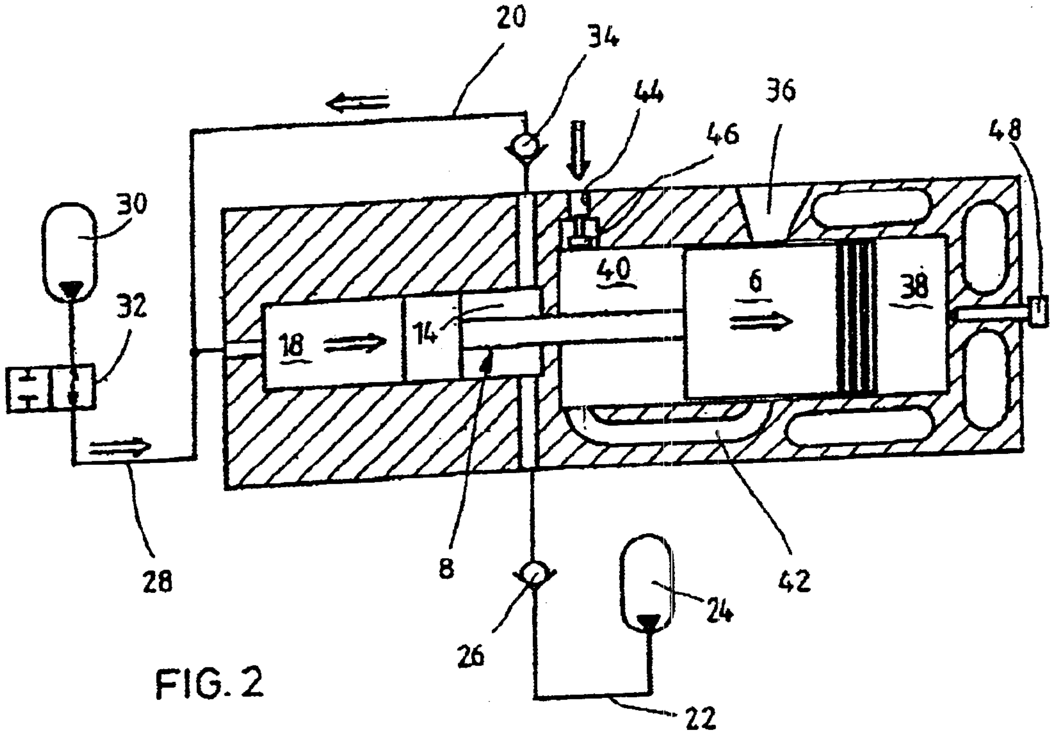
FIGS. 2 and 3 show different operating positions of the free-piston engine of FIG. 1.

In accordance with FIG. 2, fresh air is sucked into the enlarging intake chamber 40 during the compression stroke of engine piston 6 via intake passage 44 and the opened intake valve 46. Acceleration of the engine piston 6 takes place against the fresh air compression pressure polytropically increasing in combustion cylinder 38. Hereby the engine piston 6 is decelerated and comes to a standstill in the outer dead center (AT).

Figure 3:
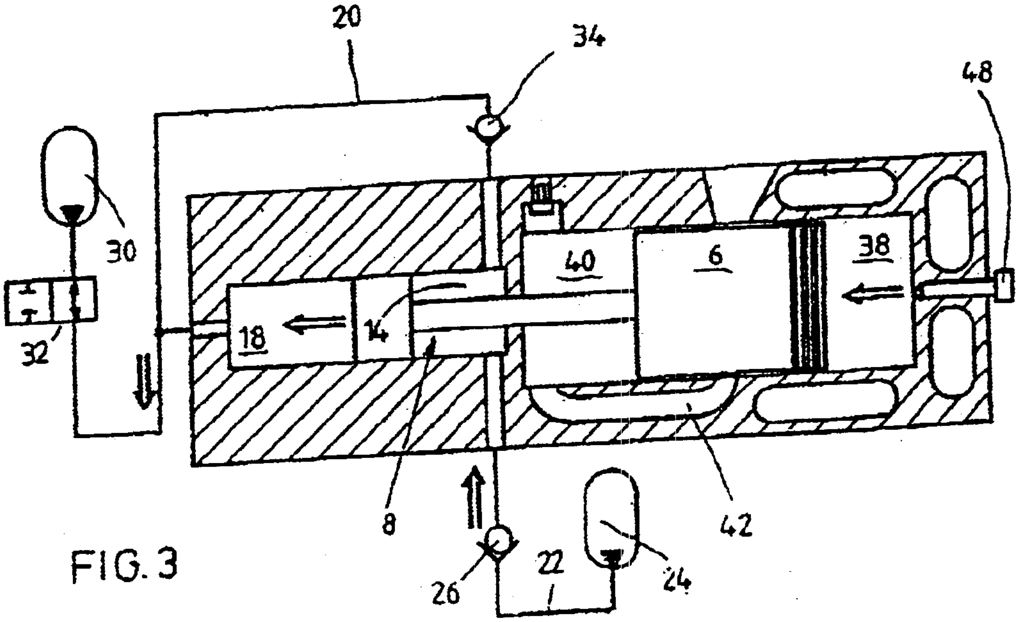

Once engine piston 6 is decelerated in its AT, fuel is injected through injector 48 and ignited as a result of the high temperature of the fresh air, so that engine piston 6—in accordance with the representation in FIG. 3—is accelerated from AT toward IT by the combustion pressure building in combustion chamber 38. This acceleration is transferred to hydraulic piston 8, so that the latter is moved to the left in the representation of FIG. 3 toward its IT. Owing to the resulting size increase of the annular space of work cylinder 14, pressure medium is sucked in from low-pressure accumulator 24 via low-pressure passage 22 and check valve 26. In parallel, the pressure medium in compression cylinder 18 is displaced into high-pressure passage 28—hydraulic accumulator 30 is charged. I.e., in the practical examples represented in FIGS. 1 to 3, charging hydraulic accumulator 30 is performed simultaneously with supplementary sucking in of pressure medium from the low-pressure accumulator. As this supplementary sucking in takes place along the entire return movement of hydraulic piston 8, cavitation phenomena do not occur in work chamber 14.

During the return movement, engine piston S and hydraulic piston 8 have their kinetic energy reduced vis-à-vis the accumulator pressure in high-pressure accumulator 30 until they are decelerated at IT. During this process, combustion cylinder 38 is scavenged by the fresh gas flowing over through overflow passage 42 from intake chamber 40. After engine piston 6 and hydraulic piston 8 have reached their IT, starting valve 32 is taken into its blocking position—free-piston engine 1 is ready for the next cycle.

Figure 4:
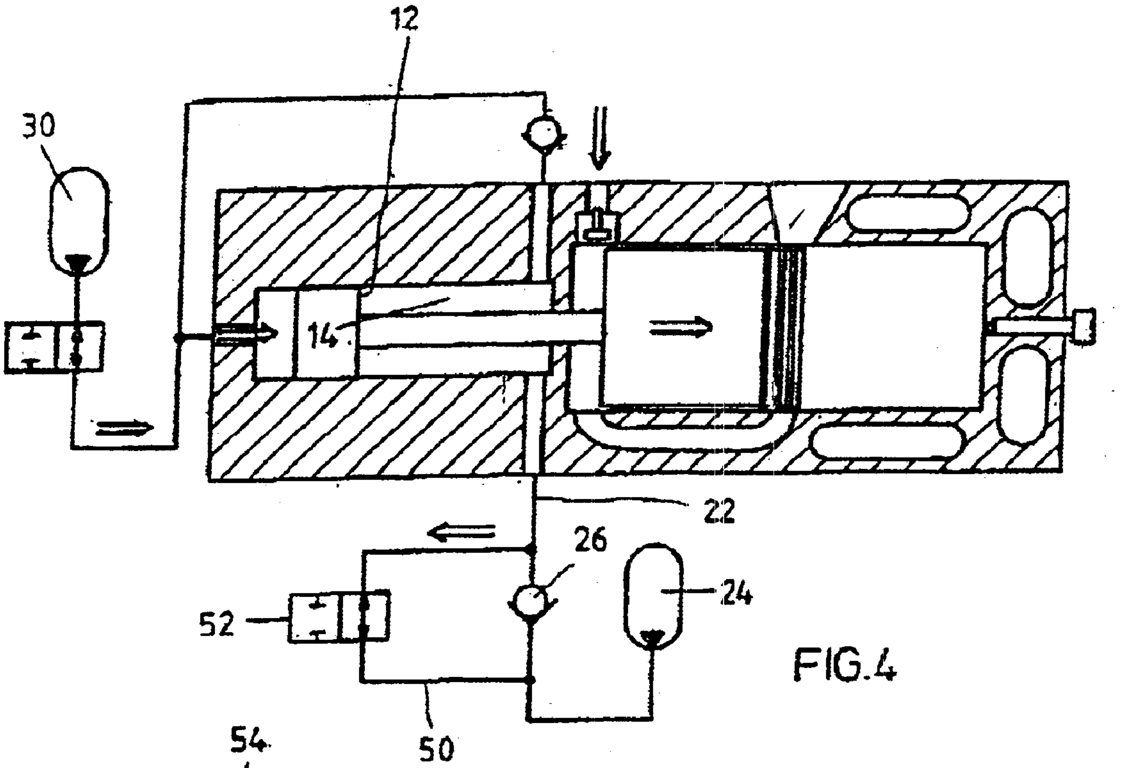
FIG. 4 shows the free-piston engine of FIG. 1 with a means for adjusting the compression pressure.

FIG. 4 shows a free-piston engine during the compression stroke, wherein the above described practical example is supplemented by a means for metering the compression energy. This means has a bypass line 50 through which check valve 26 in low-pressure passage 22 may be bypassed. In bypass line 50 a metering valve 52 designed as a 2/2-way directional control valve is provided which blocks bypass line 50 when in its blocking position.

In the blocked condition of metering valve 52, the practical example represented in FIG. 4 corresponds to the one from the above described drawings. By opening the metering valve 52 which communicates with the engine control, work chamber 14 may directly be connected with low-pressure accumulator 24, so that annular end face 12 is subjected to the pressure in low-pressure accumulator 24. Hydraulic piston 8 accordingly need not be accelerated against the pressure in high-pressure accumulator 30 during the compression stroke, so that for example at the beginning of the compression stroke, the compression energy being supplied may be increased.

In the event of malfunctions in control of the free-piston engine, e.g. in the event of misfiring, it may happen that engine piston 6 and hydraulic piston 8 cannot properly be returned to the IT. In order to facilitate return to the IT, free-piston engine 1 is adapted to include a piston retracting system in the variant represented in FIG. 5. This piston retracting system may, for example, be constituted by a piston retracting valve 54 arranged in pressure passage 20. In a home position of piston retracting valve 54 shown under a, pressure passage 20 is connected with high-pressure passage 28 in the above described manner, so that the function corresponds to the one of the above described practical example. In the event of a malfunction, starting valve 32 is controlled closed, and piston retracting valve 54 is taken into the position shown under b, wherein high-pressure passage 28 is connected with a tank T. The pressure medium located in compression cylinder 18 is then relieved of pressure toward the tank T, so that hydraulic piston 8 and thus engine piston 6 may be returned into its inner dead center position by the pressure of low-pressure accumulator 24 prevailing in work chamber 14.

Figure 6:
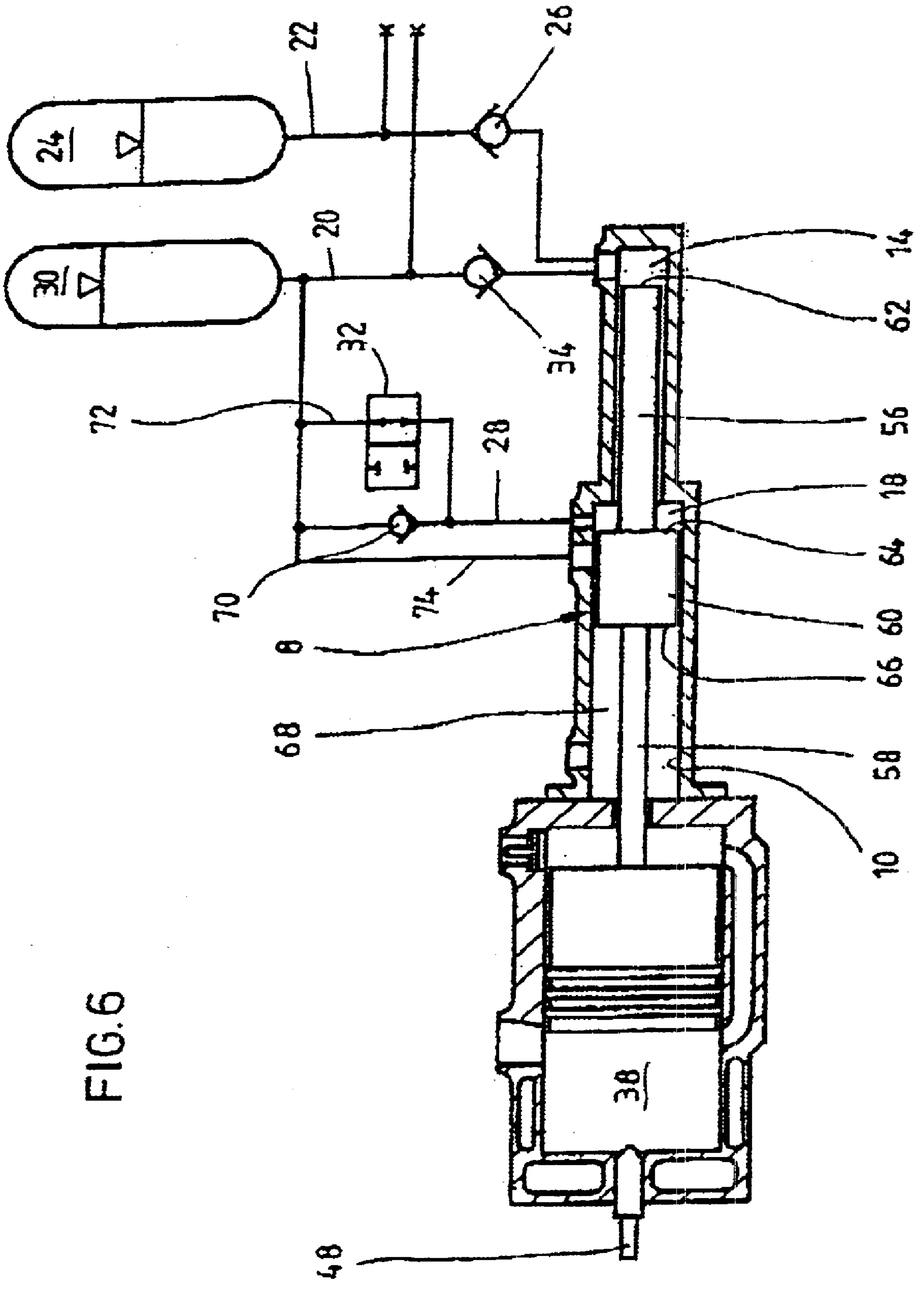
FIG. 6 shows a practical example of a free-piston engine having a hydraulic piston designed as a step piston.

FIG. 6 shows a practical example of a free-piston engine 1, wherein the hydraulic piston 8 has the form of a step piston with two piston rods 56, 58 and a ring collar 60. In this practical example, work cylinder 14 is defined by end face 62 of the right-hand piston rod 56 in the representation of FIG. 6. Compression cylinder 18 is defined by annular end face 64 of ring collar 60 facing piston rod 56. Piston rod 58 and the left-hand annular face 66 of hydraulic piston 8 define a ring cylinder 68 of axial bore 10 which receives hydraulic piston 8. Low-pressure accumulator 24 is just like in the above described practical example connected with work cylinder 14 adjacent piston rod 56 via a low-pressure passage 22 and a check valve 26. Into this work cylinder 14 there also merges the pressure passage 20 which is connected with high-pressure accumulator 30 and includes check valve 30.

High-pressure accumulator 30 is moreover via high-pressure passage 28 connected with compression cylinder 18 defined by the right-hand annular end face 64. Inside high-pressure passage 28 the starting valve 32 is arranged. Starting valve 32 may be bypassed via a bypass passage 72 having arranged therein a check valve 70 which permits a return flow of pressure medium from compression cylinder 18 to high-pressure accumulator 30.

Through the intermediary of the outer peripheral edge of annular end face 64 of ring collar 60 a pressure line 74 may be controlled open which merges into high-pressure passage 28 at a location downstream of check valve 70.

For the rest, the free-piston engine represented in FIG. 6 corresponds to that of the above described practical examples, so that further explanations may be omitted.

In order to initiate the compression stroke, starting valve 32 is taken from its blocking position into its transmitting position, so that high-pressure accumulator 30 is connected with compression cylinder 18 via pressure passage 28. Owing to the pressure acting on annular end face 64, hydraulic piston 8 is accelerated, engine piston 6 is moved toward its AT, and the fresh air present in combustion cylinder 38 is compressed. Upon completion of a predetermined axial displacement of hydraulic piston 8, the peripheral edge of annular end face 64 controls open pressure line 74, so that the pressure medium may directly enter the compression cylinder 18 while bypassing starting valve 32. Hereby the throttling loss across starting valve 32 may be minimized, for the pressure medium only flows through starting valve 32 at the beginning of the compression stroke. During the compression stroke, pressure medium is sucked into work cylinder 14 from low-pressure accumulator 24 via low-pressure passage 22 and the opening check valve 26. Engine piston 6 is decelerated by the rising compression pressure in combustion chamber 38 in the AT. Starting valve 32 is closed and fuel is injected through injector 48, and the formed mixture thus is ignited. Engine piston 6 and hydraulic piston 8 are accelerated from AT to IT, with pressure line 74 being controlled closed during the return movement of hydraulic piston 8. The expansion movement takes place against the pressure in work cylinder 14 and in compression cylinder 18, so that high-pressure accumulator 30 is charged via pressure passage 20 or high-pressure passage 28, respectively, while check valve 34 is open.

Figure 7:
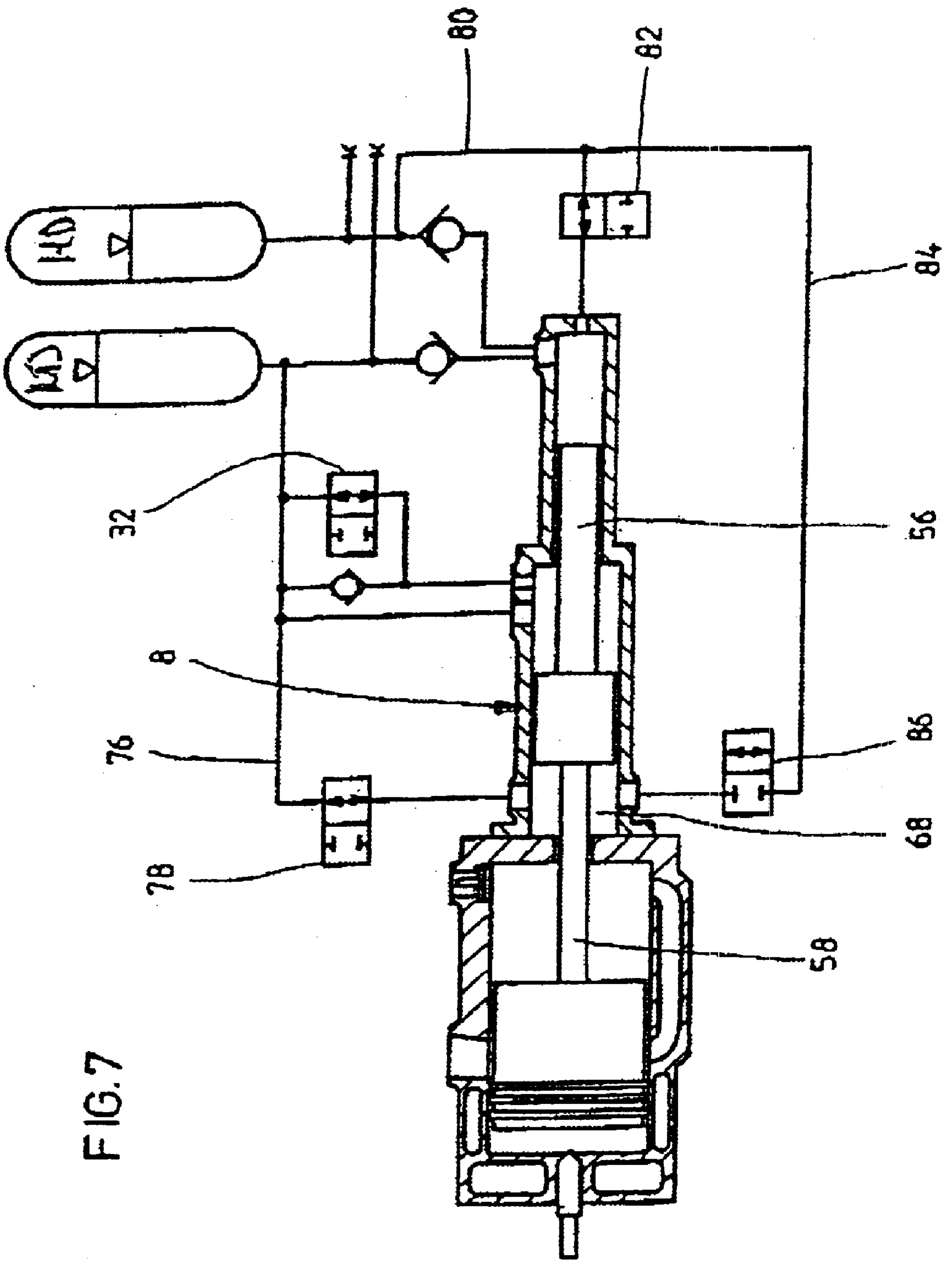
FIG. 7 shows a variant of the practical example in represented FIG. 6, including a piston retracting means.

FIG. 7 shows a variant of the free-piston engine represented in FIG. 6 with hydraulic piston 8 having the form of a step piston, wherein the latter is equipped with a piston retracting system permitting to return engine piston 6 and hydraulic piston 8 into their IT position in the event of a malfunction. In the practical example represented in FIG. 7, the piston retracting system includes a retracting passage 76 connected with high-pressure accumulator 30, which merges into ring cylinder 68. The connection between ring cylinder 68 and high-pressure accumulator 30 may be blocked or opened with the aid of a switching valve 78 designed as a 2/2-way directional control valve. In case of a malfunction, e.g. misfiring, ring cylinder 68 may be connected to high-pressure accumulator 30 via switchover valve 78, so that annular end face 66 is subjected to a pressure acting in the direction toward IT. In the practical example represented in FIG. 7, the area of piston rod 58 is moved smaller than that of piston rod 56, so that the resulting force acting on both end faces 66, 64 of ring collar 60 acts in a direction toward IT.

The pressure in work cylinder 14 may be reduced via a relief passage 80 connecting work cylinder 14 with a part of low-pressure passages 22 located downstream from check valve 26. This relief passage may be controlled open and closed through a control valve 82. I.e., as soon as retracting the piston is initiated, control valve 82 is taken into its open position, so that the pressure medium is fed into low-pressure accumulator 24 by work cylinder 14 via relief passage 80 during the return movement of hydraulic piston 8.

The annular end face 66 of hydraulic piston 8 may moreover be connected via a passage 84 to another switchover valve 86 including relief passage 80, and thus directly to low-pressure accumulator 24, so that for example during the compression stroke the rear side of hydraulic piston 8 may be subjected to a lower pressure. Hereby control valve 82 is taken into its blocking position.

Figure 8:
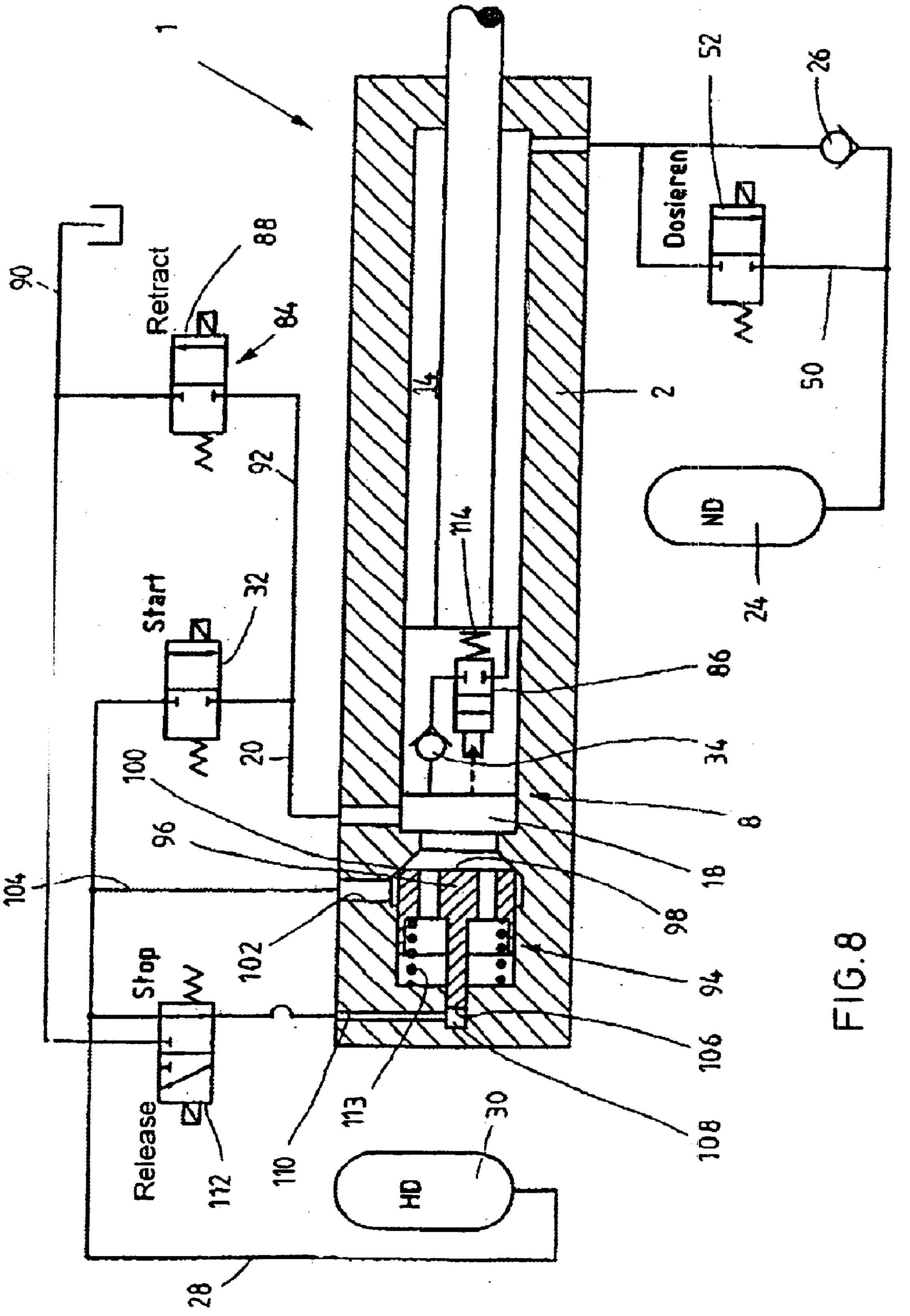
FIG. 8 shows a practical example of a free-piston engine with a modified starting means and a piston retracting assembly partly integrated in the hydraulic piston.

FIG. 8 shows a schematic representation of that range of a free-piston engine 1 having hydraulic piston 8 for driving the engine piston (not represented) arranged therein. In the practical example represented in FIG. 8—similar to the practical example in accordance with FIG. 4—low-pressure accumulator 24 is connected to the annular work chamber of work cylinder 14 via a check valve 26. Check valve 26 may be bypassed with the aid of a bypass line 50 including a metering valve 52, so that the compression energy supplied at the beginning of the compression stroke may be influenced by directly adding on low-pressure accumulator 24.

High-pressure accumulator 30 is connected to compression cylinder 18 via high-pressure passage 28 and starting valve 32 and pressure passage 20. In the represented practical example, check valve 34 is integrated into hydraulic piston 8.

Figure 5:
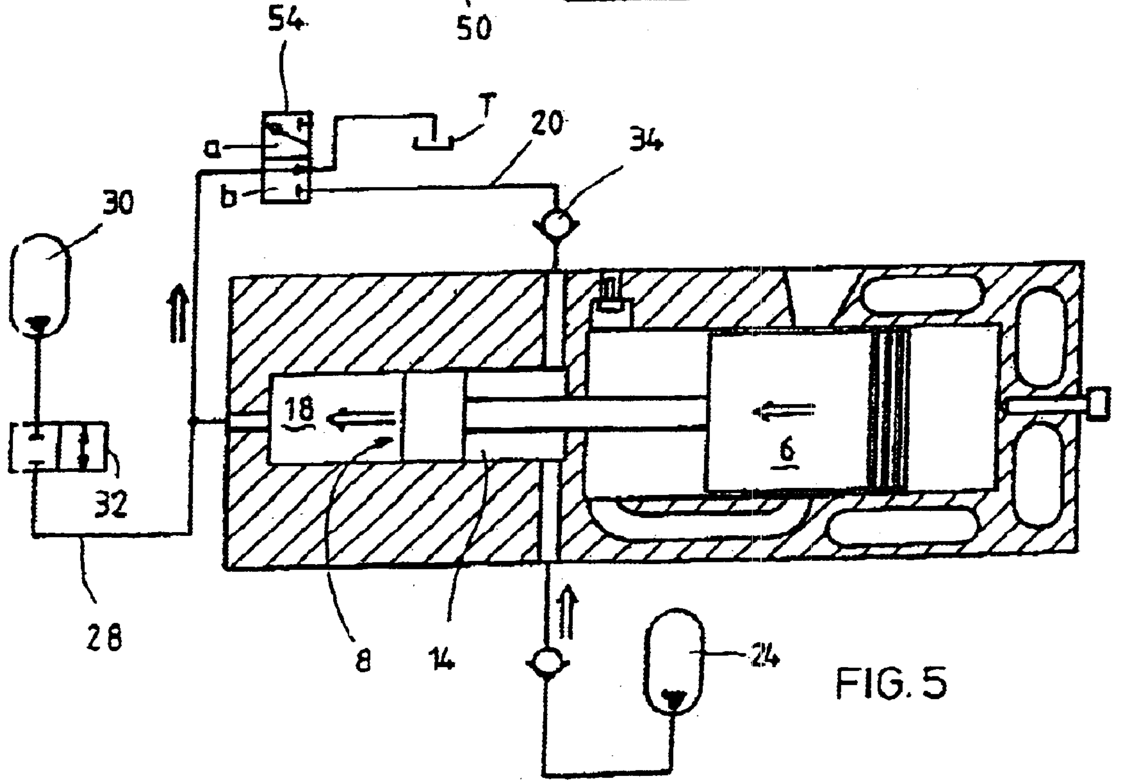
FIG. 5 shows the free-piston engine of FIG. 1 including a piston retracting means.

Similar to the embodiment represented in FIG. 5, the free-piston engine includes a piston retracting assembly 84 which is, however, in the represented solution formed by a shut-off valve 86 and a retracting valve 88. Shutoff valve 86 is also integrated into hydraulic piston 8. Retracting valve 88 has the form of a 2/2-way directional control valve which blocks a passage 92 extending between a tank passage 90 and the pressure passage 20 in its spring-biased home position, and opens this connection in its switching position.

High-pressure passage 28 may directly be connected—via a directional control valve 94 and while bypassing starting valve 32—with compression cylinder 18 which is integrated into engine housing 2 of free-piston engine 1. In the practical example represented in FIG. 8, directional control valve 94 has the form of a logic valve (2/2-way cartridge valve) with a stepped logic piston 96. The end face of logic piston 96 which has a larger area of cross-section 98 is biased against a valve seat 100. In the range of this valve seat 100 a radial port 102 is formed which is connected with high-pressure passage 28 via a bypass line 104. I.e., when logic piston 96 rests on valve seat 100, the connection between bypass line 104 and compression chamber 18 is blocked.

The other end portion of logic piston 96 which has a smaller area of cross-section 106 is guided in a control chamber 108 which may be connected with tank passage 90 or with high-pressure passage 28 via a control passage 110 and a release valve 112. Release valve 112 in the represented practical example has the form of a 3/2-way directional control valve which in the spring-biased home position thereof connects high-pressure passage 28 with control passage 110, In the switching position, the connection with high-pressure passage 28 is blocked, and control passage 110 is connected with tank passage 90.

In addition to the pressure prevailing in control chamber 108, logic piston 96 is furthermore biased against seat 104 in the closing direction by the force of a spring 113.

In order to start the free-piston engine, release valve 112 is taken into its switching position, so that the smaller area of cross-section 106 is subjected to the tank pressure. Spring 113 is designed such that the control piston initially still is biased against valve seat 100 upon starting the engine. The starting valve 32 is opened, so that compression cylinder 18 is subjected to the pressure in the high-pressure accumulator—hydraulic piston 8 is accelerated by the increasing pressure. This causes the pressure acting on the larger area of cross-section 98 of logic piston 96 to rise, so that the latter opens, rises from valve seat 100, whereby radial port 102 and thus the connection to high-pressure accumulator 30 is opened—logic valve 94 opens completely.

It is advantageous in this variant that logic piston 96 receives its energy for opening via its own control land, so that a pilot valve is not necessary. The opening movement takes place very rapidly, so that the pressure in compression cylinder 18 may be increased with high dynamic properties. During operation of free-piston engine 1, logic piston 96 remains in its open position.

In order to stop the free-piston engine, starting valve 32 is closed and release valve 112 is switched into its home position, so that the smaller area of cross-section 106 of logic piston 96 is subjected to the pressure in the high-pressure accumulator. Free-piston engine 1 then comes to a standstill while starting valve 32 and logic valve 94 are closed. I.e., in the above described solution, logic valve 94 also acts as a check valve whereby the connection from compression cylinder 18 to high-pressure accumulator 30 may be controlled open.

As can be seen from the schematic representation in accordance with FIG. 8, shut-off valve 86 is subjected to the force of a closing spring 114 in the closing direction and to the pressure in compression cylinder 18 in the opening direction. While shut-off valve 86 is open, work cylinder 14 is connected with compression cylinder 18 via check valve 34. Accordingly, during the above described pressure buildup in compression cylinder 18, shut-off valve 86 is taken into its open position, so that during the compression stroke the pressure building up in work cylinder 14 may be utilized via check valve 34 and high-pressure passage 28 in order to charge high-pressure accumulator 30.

Figure 9:
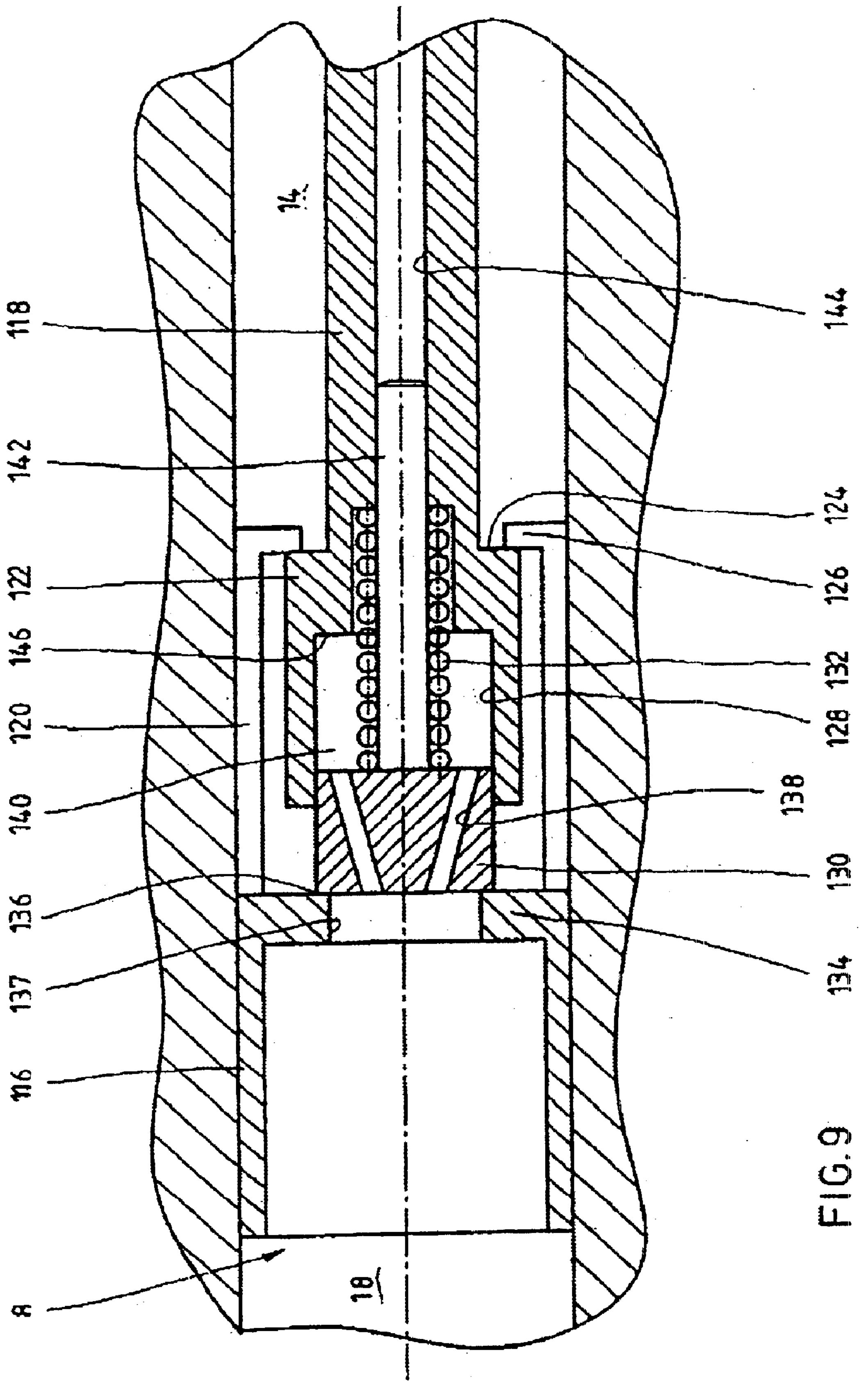
FIG. 9 shows a constructive solution of the hydraulic piston of FIG. 8.

FIG. 9 shows a possible constructive solution for integrating check valve 84 and shut-off valve 86 into hydraulic piston 8. Accordingly the latter has the form of a divided piston comprising a collar 116 and a piston rod 118 having a reduced diameter in comparison with the outer diameter of collar 116. Collar 116 and piston rod 118 are connected with each other through a sliding sleeve 120. For connection in the axial direction, piston rod 118 has a larger-diameter end portion 122 arranged inside sliding sleeve 120. In the represented stop position, a rear stop surface 124 contacts a stop ring 126 of sliding sleeve 120. End portion 122 is designed with a guide bore 128 wherein closing body 130 is guided axially slidingly guided. The latter is biased toward collar 116 through a compression spring 132. The latter is of cup-shaped configuration and has a recess 137 in its bottom surface 134. In the represented home position, this recess 137 is closed by the closing body 130 biased thereagainst, so that the connection between compression cylinder 18 and work cylinder 14 is blocked. Closing body 130 thus forms a seat 136 for collar 116.

In accordance with FIG. 9, closing body 130 has compensation bores 138 through which the pressure medium may enter from work cylinder 18 in a spring chamber 140. Closing body 130 has a guide mandrel 142 that sealingly plunges into an axial bore 144 of piston rod 118. The force of compression spring 132 and the difference of area between the left-hand, seat-side end face and the right-hand, spring-chamber side annular end face is selected such that closing body 130 still is biased into its closing position in the presence of a pressure in work cylinder 18 that is lower than the pressure in low-pressure accumulator 24. As soon as a higher pressure is reached in work cylinder 18, closing body 130 is moved to the right against the force of compression spring 132 until it contacts a stop shoulder 146. By the pressure in work cylinder 18, collar 116 is also displaced to the right (view of FIG. 9) in the axial direction relative to piston rod 118 until it contacts closing body 130, so that recess 137 is blocked. If the pressure in work cylinder 14 rises to a pressure greater than/equal to the pressure in compression cylinder 18 during the compression stroke, collar 116 is raised from closing body 130 by the pressure difference acting on its end face, and the connection between work cylinder 14 to compression cylinder 18 is controlled open—high-pressure accumulator is charged. I.e., in this practical example, collar 116 acts as a check valve for controlling open the connection between work cylinder 14 and compression cylinder 18. Closing body 130 with compression spring 132 practically acts as a shut-off valve which is taken into its open position when the pressure in compression cylinder 18 rises. This shut-off valve only closes if the pressure in compression cylinder 18 is lower than the pressure in low-pressure accumulator 24. Such a low pressure is set whenever the free piston purposely is to be moved back into its starting position.

In particular the above described solution is characterized by an extremely compact structure, wherein due to the direct connection between work and compression cylinders 14, 18 the throttling losses are minimum. Fundamentally the solutions explained in FIGS. 8 and 9 may also be realized in the above described practical examples.

The additional equipment represented in the above described practical examples may fundamentally be used in both of the above mentioned variants with stepped piston or differential piston, either singly or in combination.

Instead of the 3/2-way directional control valve represented in FIG. 5 it is also possible to use a 2/2-way directional control valve as the piston retracting valve 54, in which case check valve 34 should also be adapted to be lockable.

What is disclosed is a free-piston engine including an engine piston capable of being driven through a stepped hydraulic piston. The larger diameter of the hydraulic piston is guided in a compression cylinder, whereas the smaller diameter is arranged in a work cylinder. During the compression stroke, the compression cylinder is connected with a high-pressure accumulator, and the work cylinder is connected with a low-pressure accumulator or a high-pressure accumulator. During one expansion stroke, the high-pressure accumulator is charged by the pressure medium displaced from the cylinder chambers.

Reference Numerals:

1 free-piston engine
2 engine housing
4 combustion cylinder
6 engine piston
8 hydraulic piston
10 axial bore
12 annular end face
14 work cylinder
16 end face
18 compression cylinder
20 pressure passage
22 low-pressure passage
24 low-pressure accumulator
26 check valve
28 high-pressure passage
30 high-pressure accumulator
32 starting valve
34 check valve
36 outlet passage
38 combustion chamber
40 intake chamber
42 overflow passage
44 intake passage
46 intake valve
48 injector
50 bypass line
52 metering valve
54 piston retracting valve
56 piston rod
58 piston rod
60 ring collar
62 end face, small
64 right-hand annular end face
66 annular face
68 ring cylinder
70 check valve
72 bypass passage
74 pressure line
76 retracting passage
78 switchover valve
80 relief passage
82 control valve
84 piston retracting assembly
86 shut-off valve
88 retracting valve
90 tank passage
92 passage
94 directional control valve
96 logic piston
98 larger area of cross-section
100 valve seat
102 radial port
104 bypass line
106 smaller area of cross-section
108 control chamber
110 control passage
112 release valve
113 spring
114 closing spring
116 collar
118 piston rod
120 sliding sleeve
122 end portion
124 stop surface
126 stop ring
128 guide bore
130 closing body
132 compression spring
134 bottom surface
136 seat
137 recess
138 compensation bore
140 spring chamber
142 guide mandrel
144 axial bore
146 stop shoulder

What is claimed is:

1. A free-piston engine comprising:

an engine piston driven through a stepped hydraulic piston, said stepped hydraulic piston having a smaller-diameter portion thereof arranged in a work cylinder and a large-diameter portion thereof in a compression cylinder that is subjected to pressure medium from a pressure medium accumulator via a starting valve during the compression stroke, wherein during the compression stroke or the expansion stroke pressure medium is sucked into said work cylinder from a low-pressure accumulator and wherein during the expansion stroke the pressure medium is employed in one of said cylinders for charging a pressure medium accumulator, and wherein said pressure medium accumulator is a high-pressure accumulator which is connected both with said work cylinder and with said compression cylinder.

2. The free-piston engine in accordance with claim 1, wherein a larger end face of said hydraulic piston is connected with said high-pressure accumulator, and a smaller annular end face of said piston is connected with said high-pressure accumulator via a check valve or with said low-pressure accumulator via a second check valve.

3. The free-piston engine in accordance with claim 1, wherein said hydraulic piston is a step piston having a piston rod guided in said work cylinder, the piston portion having a larger diameter being guided in said compression cylinder.

4. The free-piston engine in accordance with claim 1, including a pressure line merging into a high-pressure passage between starting valve and high-pressure accumulator on the one hand and into said compression cylinder on the other hand and being controlled open during the compression stroke of said hydraulic piston, wherein the portion of said high-pressure passage arranged between said starting valve and said compression cylinder is connected with said pressure line via a line including a check valve.

5. The free-piston engine in accordance with claim 4, wherein a retracting passage including a switchover valve branches off from said high-pressure passage to merge into a ring cylinder through which another piston rod extends, so that pressure medium is applied to an annular face acting in a direction toward the inner dead center of said engine piston when said switchover valve is controlled open.

6. The free-piston engine in accordance with claim 5, wherein said piston rod on the engine piston side has a smaller diameter than said other piston rod.

7. The free-piston engine in accordance with claim 1, wherein a bypass line bypassing a check valve is provided in a low-pressure passage between said work cylinder and said low-pressure accumulator.

8. The free-piston engine in accordance with claim 7, further including a metering valve to block said bypass line.

9. A free-piston engine comprising:

an engine piston driven through a stepped hydraulic piston, said stepped hydraulic piston having a smaller-diameter portion thereof arranged in a work cylinder and a large-diameter portion thereof in a compression cylinder that is subjected to pressure medium from a pressure medium accumulator via a starting valve during the compression stroke, wherein pressure medium is sucked into said work cylinder from a low-pressure accumulator, while during the expansion stroke the pressure medium is employed in one of said cylinders for charging a pressure medium accumulator, and wherein said pressure medium accumulator is a high-pressure accumulator which is connected both with said work cylinder and with said compression cylinder;

wherein a larger end face of said hydraulic piston is connected with said high-pressure accumulator, and a smaller annular end face of said piston is connected with said high-pressure accumulator via a check valve or with said low-pressure accumulator via a second check valve including a directional control valve, the piston of which permits to control open a bypass line bypassing said starting valve.

10. The free-piston engine in accordance with claim 9, wherein said directional control valve is a logic valve having a logic piston with a stepped configuration, wherein a smaller area of cross-section is subjected to the pressure in said high-pressure accumulator via a release valve, and the larger area of cross-section thereof is subjected to the pressure in said compression cylinder.

11. The free-piston engine in accordance with claim 10, wherein said release valve is a 3/2-way directional control valve applying the pressure in said high-pressure accumulator or a pressure in a tank passage to the smaller area of cross-section in its switching positions.

12. A free-piston engine comprising:

an engine piston driven through a stepped hydraulic piston, said stepped hydraulic piston having a smaller-diameter portion thereof arranged in a work cylinder and a large-diameter portion thereof in a compression cylinder that is subjected to pressure medium from a pressure medium accumulator via a starting valve during the compression stroke, wherein pressure medium is sucked into said work cylinder from a low-pressure accumulator, while during the expansion stroke the pressure medium is employed in one of said cylinders for charging a pressure medium accumulator, and wherein said pressure medium accumulator is a high-pressure accumulator which is connected both with said work cylinder and with said compression cylinder including a piston retracting valve arrangement whereby said compression cylinder is connected with at least one of a group including said tank and said high-pressure accumulator.

13. The free-piston engine in accordance with claim 12, wherein said piston retracting assembly includes a shut-off valve for connecting said work cylinder with said compression cylinder and a retracting valve for connecting said compression cylinder with said tank, wherein said shut-off valve is integrated into said hydraulic piston.

14. The free-piston engine in accordance with claim 13, wherein said check valve associated with said high-pressure accumulator is also integrated into said hydraulic piston.

15. The free-piston engine in accordance with claim 14, wherein a collar of said hydraulic piston forming a larger piston diameter is connected with a piston rod through the intermediary of a sliding sleeve, said piston rod being axially displaceably guided in said sliding sleeve by an end portion thereof, wherein said collar closes a control cross-section in one translatory position, so that a connection between said compression cylinder and said work cylinder is interrupted.

16. The free-piston engine in accordance with claim 15, wherein a closing body biased with the aid of a compression spring against a recess in the bottom surface of said collar is guided in said end portion, the pressure in said compression cylinder being reported into a spring chamber for said compression spring via compensation bores of said closing body, and that surface of said closing body acting in closing direction being smaller than that end face of said closing body acting in opening direction.

* * * * *